United States Patent [19]

Taylor et al.

[11] Patent Number: 5,069,072
[45] Date of Patent: Dec. 3, 1991

[54] CONNECTOR MODULE FOR TRANSDUCER

[75] Inventors: Donald J. Taylor; Anthony G. Zumo, both of Baton Rouge, La.; John R. Bussema, Villa Park, Ill.

[73] Assignee: Woodhead Industries, Inc., Northbrook, Ill.

[21] Appl. No.: 557,756

[22] Filed: Jul. 26, 1990

[51] Int. Cl.⁵ .................................................. G01L 9/00
[52] U.S. Cl. ........................................ 73/756; 73/4 R; 73/753; 73/865.9; 439/628
[58] Field of Search .................. 73/753, 754, 756, 717, 73/718, 719, 720, 721, 722, 723, 724, 725, 726, 727, 728, 1R, 118.1, 4 R, 865.9; 324/556; 439/148, 320, 628

[56] References Cited

U.S. PATENT DOCUMENTS

| 4,567,756 | 2/1986 | Colborn | 73/118.1 |
| 4,797,007 | 1/1989 | Elmore, III | 73/756 |
| 4,797,623 | 1/1989 | Hoffman et al. | 324/556 |

Primary Examiner—Donald O. Woodiel
Attorney, Agent, or Firm—Emrich & Dithmar

[57] ABSTRACT

An apparatus for the in-line testing of a transducer including a connector module having a source port, an outlet port, and a test port. The source port is connected to a power source and the outlet port is connected to a transducer. A cap, coupled to the test port, allows for the transmission of power from the power source to the transucer. The transmission of power from the power source to the transducer may be interrupted by removing the cap from the test port. A conventional testing instrument may be connected to the test port for testing or calibration of the transducer once the cap has been removed from the test port.

18 Claims, 1 Drawing Sheet

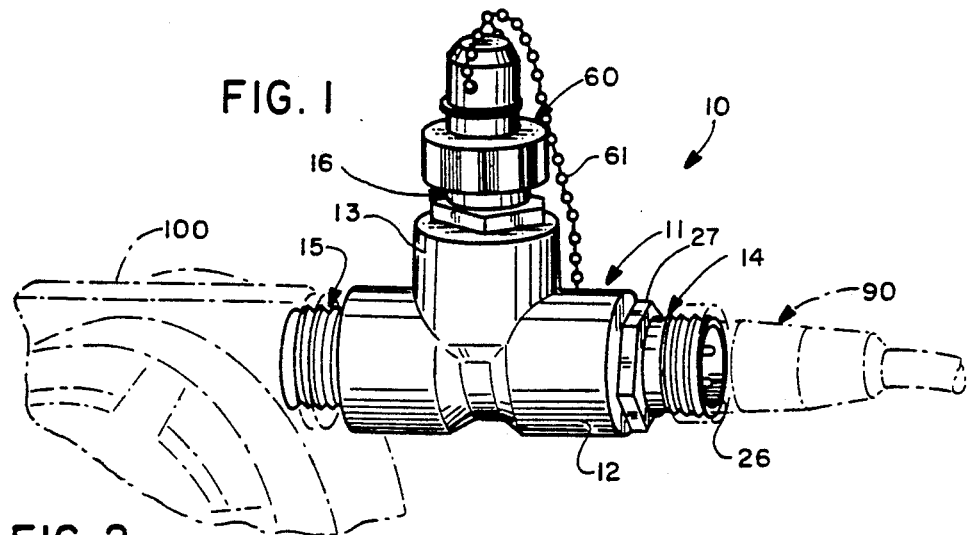
FIG. 1
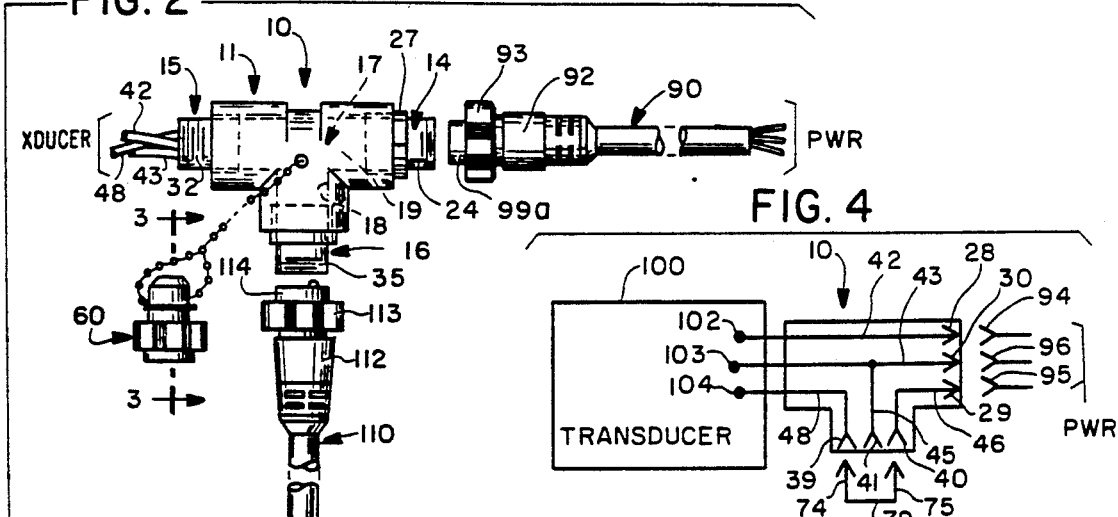
FIG. 2
FIG. 4
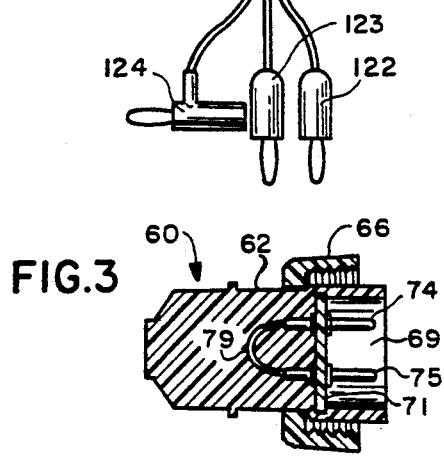
FIG. 3
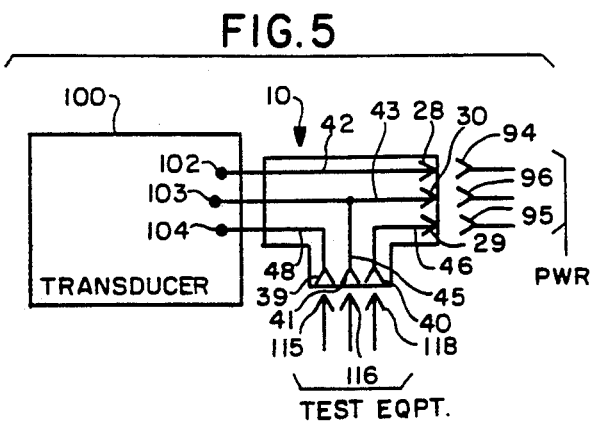
FIG. 5

CONNECTOR MODULE FOR TRANSDUCER

FIELD OF THE INVENTION

The present invention relates to an apparatus for the in-line testing of a transducer; and, more particularly, to a connector module, coupled between the transducer and a power source, which is configured to allow the in-line testing and calibration of the transducer.

BACKGROUND OF THE INVENTION

The use of a transducer (or "transmitter", as it is sometimes referred to) to measure the pressure of a fluid in a pipe is well known and established in the processing industry. Typically, the transducer has an impedance which is a function of the pressure being sensed. Hence, the current flowing through the transducer is a measure of the pressure sensed. In order to insure that the current is an accurate measure of pressure, there is a need to calibrate the transducer frequently.

The transducer is normally hardwired between the production line and the power source. A disadvantage associated with hardwiring the transducer is that, upon transducer failure, the production line must be shut down so that the failed transducer can be replaced with a new one which must be hardwired into the production line. The necessity of hardwiring a replacement transducer contributes to costly downtime of the production line.

Further, the in-line testing of the transducer is time-consuming. In order to calibrate the transducer, a cover must be removed and the power leads must be disconnected from the transducer and connected to the calibrating instrument. Additionally, removal of the cover from the transducer unnecessarily exposes the terminals and elements therein to caustic or corrosive atmospheres.

SUMMARY OF THE INVENTION

The present invention contemplates an apparatus for the economical and expedient in-line testing and/or replacement of a transducer.

According to the present invention, a connector module is threaded into an inlet of a transducer housing. The module has a rigid housing in the form of a Tee having three ports—a source (or power) port, an outlet (or connection) port and a test port. The source port has three connector terminals adapted to be coupled to appropriate terminals of a power cable. The test port has three connector terminals; two are connected to respective power leads, and the third is connected to the "hot" power terminal of the transducer by a first wire.

The outlet port couples mechanically to the transducer, and acts as a conduit for the power leads and the ground lead from the source port to the transducer. A removable cap is provided for the test port and establishes continuity between the "hot" lead of the power port and the transducer when the cap is assembled to the test port. When the cap is removed, the power lead is interrupted at the test port, permitting test instruments to be connected to the transducer via the test port for testing or calibration of the transducer without having to open the housing of the transducer.

In order to replace a transducer, the power cable is disconnected from the module, the failed transducer is removed and replaced with another one having its own connector module. Once the pre-wired replacement is installed in the production line, the power cable is reconnected to the module and normal operations are resumed.

Thus, the present invention provides an apparatus which provides an alternative to hardwiring transducers in a process control. The present invention also provides for the quick and efficient access of the transducer circuit to allow for the testing and/or calibration of the transducer without risking exposure of integral transducer parts to damaging corrosive environments. Additionally, the present invention provides for the accurate, speedy, and cost-effective replacement of a failed transducer thereby assuring that downtime during replacement is kept to a minimum.

The features and advantages of the present invention will be more fully appreciated after a better understanding is obtained of the invention from the attached drawings wherein identical reference numerals refer to like parts in the various views.

BRIEF DESCRIPTION OF THE DRAWINGS

FIG. 1 is a perspective view of the connector module of the instant invention, the opposite ends of which are connected respectively to a transducer and a power cable, shown in phantom;

FIG. 2 is a perspective view of the connector module showing how a test cable may be used with the module;

FIG. 3 is a cross-sectional view of the plug, taken along the sight lines 3—3 of FIG. 2;

FIG. 4 is a schematic wiring diagram of the module, showing connections to a power source and the transducer; and FIG. 5 a schematic wiring diagram illustrating the in-line testing of the transducer.

DETAILED DESCRIPTION OF THE PREFERRED EMBODIMENT

Turning first to FIG. 1, reference numeral 10 generally designates a connector module incorporating the present invention connected between a power cable 90 and a transducer 100.

The connector module 10 has a Tee shape (shown inverted in FIG. 1) including a rigid housing 11 having a generally cylindrical elongated portion 12 forming the top of the "Tee", and a generally cylindrical base portion 13 formed integrally with and at a right angle to the cylindrical portion 12. The elongated portion 12 of the housing 11 provides a source (or power) port 14 and an outlet port 15 opposite the source port 14. The base portion 13 defines a test port 16 between the source port 14 and the outlet port 15. The housing 11 may be made of suitable plastic or metal.

The connector module 10 includes a first bore 17, shown in phantom in FIG. 2, extending between the power port 14 and the outlet port 15. The module 10 also includes a second bore 18 extending through the test port 16 and communicating with the first bore 17. The bores 17 and 18 define an interior channel or conduit 19 as seen in FIG. 2.

As shown in FIG. 2, the source port 14 includes a threaded outer surface 24 and an interior 26 (FIG. 2). A nut 27 extends circumferentially around the outer surface 24 and is formed integrally therewith. Although not shown, a conventional three-pole P.V.C. male insert is disposed within the interior 26 of the source port 14. As shown in FIG. 1, and as better shown schematically in FIGS. 4 and 5, the insert includes a ground connector element 28, a power connector element 29, and a power return (i.e., neutral) connector element 30.

As shown in FIG. 2, the outlet port 15 includes a threaded outer surface 32 and an interior (not shown) similar to the interior 26 of the source port 14. The test port 16 also includes a threaded outer surface 35. A nut 38 extends circumferentially around the outer surface 35 and is formed integrally therewith. A conventional three-pole female connector insert is disposed within the interior of the test port 16. As shown schematically in FIGS. 4 and 5, the insert includes two power terminals 39 and 40, and a neutral terminal 41.

As shown in FIG. 2 and schematically in FIGS. 4 and 5, an insulated ground wire 42 extends through the interior of the module connecting the ground terminal 28 of the source port 14 with a ground terminal of the outlet port 15. A power return or neutral wire 43 connects the power return terminals of the source port 14 and the outlet port 15. An extension wire 45 connects the neutral wire 43 directly to the neutral terminal 41 of the test port 16. A first "hot" or power lead wire 46 extends between the power terminal 29 of the source port 14 and the power terminal 40 of the test port 16, and a second wire 48 extends between a power terminal of the outlet port 15 and a second power terminal 39 of the test port 16.

As shown in FIGS. 1 and 2, a cap 60 is attached to the module 10 by means of a chain 61. As shown in FIG. 3, the cap 60 includes a molded body 62 which may be composed of a rubber compound. The cap 60 is provided with a nut 66 for coupling the cap 60 to the test port 16 by engaging a shoulder 63 on the cap. A base 71 mounts two connector elements 74 and 75 which are electrically connected by a wire 79.

As shown in FIGS. 1 and 2, a power/control cable 90 is coupled to the source port 14 of module 10 by nut 93. A conventional three-pole female connector insert 99a is housed within a head 92 of the cable. As shown schematically in FIGS. 4 and 5, the insert 99a has a ground terminal 94, a power terminal 95, and a power return (i.e., neutral) terminal 96. The power cable 90 may be connected to a power source.

As shown in phantom in FIG. 1, the outlet port 15 of the module 10 is mounted to a transducer 100. Although the use of the module 10 is described in connection with a transducer, it is understood that the module 10 is likewise applicable with a variety of sensing or control devices which are coupled into a production line for measuring pressure, flow rate or other characteristics. Referring to FIG. 2 and, more particularly, FIGS. 4 and 5, the wires 42, 43, and 46 are connected respectively to a ground terminal 102, a power return (i.e., neutral) terminal 103, and a power terminal 104 in the transducer 100.

As shown in FIG. 2, a test cable 110 may also be coupled to the test port of module 10. The test cable 110 includes a molded head 112, a nut 113 for securely coupling the cable 110 to the test port 16, and a conventional three-pole male connector insert 114 extending from the head 112. As shown schematically in FIG. 5, the insert 114 has a power "in" connector element 115, a power return (i.e., neutral) connector element 116, and a power "out" connector element 118. The test cable 110 includes plugs 122-124 which may be connected to a conventional meter (not shown).

As evidenced from the above description, the quick connect and disconnect configuration of the plug 60, the power cable 90, and the test cable 110 significantly reduces the high production and labor costs typically associated with the hardwiring of a transducer.

During normal operation, and as shown in FIG. 4, power is fed through the power cable 90, through the lead wire 46, through the wire 79 in the cap 60, through the wire 48, and into the transducer 100. The terminals 74 and 75 and the wire 79 in the cap 60 thus provide continuity between the lead wire 46 and the wire 48 and thus the transmission of power from the cable 90 to the transducer 100. Signals from the transducer 100 are transmitted through the power return wire 43, through the power cable 90, and into the power source.

According to the present invention, the transducer 100 can be tested and calibrated in-line without exposing the elements in the transducer to corrosive or contaminating atmospheres. The in-line testing is made possible by the temporary interruption of the power being fed from the power source to the transducer 100. According to the invention, the power is interrupted by removing the cap 60 from the test port 16. When removed therefrom, the terminals 39 and 40 are electrically disconnected from each other since the terminals 74 and 75 in the cap 60 are no longer in contact with the terminals 39 and 40, respectively. As a result, continuity between the lead wire 46 and the wire 48 is temporarily interrupted and thus power cannot be transferred from the power source to the transducer 100.

In order to test or calibrate the transducer 100, the plugs 122-124 of the cable 110 are first coupled into appropriate ports of the meter. Thereafter, the cap 60 is removed from the test port 16 and the test cable 110 is connected in place thereof. Once testing or calibration is complete, the cable 110 is removed from the test port 16 and the plug 60 is re-connected thereto to resume normal operations. The connector module 10 thus allows a user to literally tap into the transducer 100 for testing purposes quickly and efficiently.

The connector 10 additionally allows a user to replace a failed transducer with accuracy and speed. If a transducer fails, the power cable 90 is first disconnected from the source port 14 of the module 10. Then, the failed transducer is removed. Thereafter, a pre-wired replacement, including a transducer which has been pre-wired to a connector module 10, is installed into the production line. The power cable 90 is then re-connected to the source port 14 and normal operations are resumed. The use of the module 10 thus significantly reduces the downtime typically associated with the replacement of a failed transducer.

Having thus disclosed in detail a preferred embodiment of the invention, persons skilled in the art will be able to modify certain of the structure which has been illustrated and to substitute equivalent elements for those disclosed while continuing to practice the principle of the invention; and it is, therefore, intended that all such modifications and substitutions be covered as they are embraced within the spirit and scope of the appended claims.

We claim:

1. In combination with a sensing device connected to a power source, a connector module connected between the sensing device and the power source, said module comprising: a housing providing a source port, an outlet port, and a test port, said source port including a plurality of connector elements adapted to be connected to said power source, said test port including a plurality of connector elements; means for mounting said outlet port to said sensing device; a plurality of first conductors, one connected to each connector element of said source port, one of said first plurality of conductors being connected to one of the connector elements of said test port; a continuation conductor connected to a second connector element of said test port, said continuation connector and the others of said plurality of conductors being connected to said sensing device, such that power is fed from the power source to the sensing device through said module; and a cap adapted to be assembled to said test port, said cap having first and second connector elements in electrical continuity with each other and adapted to connect said first and second connector elements of said test port together when said cap is assembled to said test port, said cap being removable from said test port thereby interrupting the power fed from the power source to the sensing device and permitting an instrument to be connected to said test port for in-line testing the sensing device.

2. The combination of claim 1, wherein said source port and said outlet port are located at opposite ends of said housing, and said test port is located therebetween.

3. The combination of claim 1, wherein the sensing device includes a ground terminal, a neutral terminal, and a power terminal, said source port having a ground terminal, a neutral terminal, and a power terminal, said test port having first and second power terminals and a neutral terminal, a lead in said housing connecting said power terminal and said first power terminal of said source port and said test port, respectively, and a wire in said housing connecting said second power terminal of said test port and said power terminal of said sensing device.

4. The combination of claim 3, wherein said outlet port is a conduit for said wire.

5. The combination of claim 3, wherein said cap includes means for connecting said first and second power terminals of said test port to allow the power to be fed from the power source to the sensing device.

6. The combination of claim 5, wherein said means for connecting said first and second power terminals of said test port includes contact means in the interior of said cap.

7. The combination of claim 6, wherein said contact means comprises first and second terminals connected by a wire, said first and second terminals being in contact with said first and second power terminals of said test port when said cap is connected to said test port.

8. The combination of claim 3, further including a ground wire in said housing connecting said ground terminal of said source port and said sensing device, and a neutral wire in said housing connecting said neutral terminals of said source port and said sensing device.

9. The combination of claim 8, wherein said outlet port is a conduit for said ground wire and said neutral wire.

10. The combination of claim 1, wherein said source port has a ground terminal, a neutral terminal, and a power terminal adapted to be coupled to a ground terminal, a neutral terminal, and a power terminal, respectively of a power cable between the power source and said module.

11. The combination of claim 1, wherein said test port has first and second power terminals and a neutral terminal adapted to be coupled to first and second power terminals and a neutral terminal, respectively of a test cable coupled to said test port when said cap is removed therefrom.

12. In combination with a sensing device connected to a power source, a module connected between the sensing device and the power source, said module comprising: a housing including a source port having a power terminal, a test port having first and second power terminals, and said sensing device having a power terminal; a lead in said housing connecting said power terminal of said source port and said first power terminal of said test port, and a wire in said housing connecting said power terminal of said sensing device and said second power terminal of said test port; and removable closure means for enclosing said test port and for connecting said first and second power terminals of said test port to establish continuity between said lead and said wire so that power is fed from said power source to said sensing device when said closure means is assembled to said test port, said closure means interrupting said lead and said wire when said closure means is removed from said test port.

13. The combination of claim 12, wherein said outlet is a conduit for said wire.

14. The combination of claim 12, wherein said closure means comprises a cap coupled to said test port, said cap including contact means therein for connecting said lead and said wire, said cap being removable from said test port to disconnect said lead and said wire and thereby interrupt the continuity.

15. The combination of claim 14, wherein said contact means comprises first and second terminals connected by a wire, the continuity between said lead and said wire being established when said first and second terminals contact said first and second power terminals, respectively.

16. The combination of claim 12, wherein said source port and said outlet port are located at opposite ends of said housing, and said test port is located therebetween.

17. The combination of claim 12, wherein said source port and said sensing device each include a ground terminal and a neutral terminal, a ground wire in said housing connecting said ground terminals of said source port and said sensing device, and a neutral wire in said housing connecting said neutral terminals of said source port and said sensing device.

18. The combination of claim 17, wherein said outlet port is a conduit for said ground wire and said neutral wire.

* * * * *

UNITED STATES PATENT AND TRADEMARK OFFICE
CERTIFICATE OF CORRECTION

PATENT NO. : 5,069,072
DATED : December 3, 1991
INVENTOR(S) : Donald J. Taylor, et al It is certified that error appears in the above-identified patent and that said Letters Patent is hereby corrected as shown below:

Claim 13, Col. 6, line 30, after "outlet" insert --port--.

Signed and Sealed this

Twenty-third Day of March, 1993

Attest:

STEPHEN G. KUNIN

Attesting Officer    Acting Commissioner of Patents and Trademarks